(12) United States Patent
Tuttle

(10) Patent No.: US 9,840,752 B2
(45) Date of Patent: Dec. 12, 2017

(54) METHOD AND APPARATUS FOR PERFORMING A LOCALIZED POST-WELD HEAT TREATMENT ON A THIN WALL METALLIC CYLINDER

(71) Applicant: Keystone Engineering Company, Long Beach, CA (US)

(72) Inventor: Wayne H. Tuttle, Torrance, CA (US)

(73) Assignee: Keystone Engineering Company, Long Beach, CA (US)

( * ) Notice: Subject to any disclaimer, the term of this patent is extended or adjusted under 35 U.S.C. 154(b) by 638 days.

(21) Appl. No.: 14/287,975

(22) Filed: May 27, 2014

(65) Prior Publication Data

US 2015/0344987 A1 Dec. 3, 2015

(51) Int. Cl.
| | |
|---|---|
| H05B 6/02 | (2006.01) |
| C21D 1/42 | (2006.01) |
| B23K 15/00 | (2006.01) |
| C21D 9/50 | (2006.01) |
| C22C 19/05 | (2006.01) |
| C22F 1/10 | (2006.01) |

(Continued)

(52) U.S. Cl.
CPC ............... *C21D 9/50* (2013.01); *C21D 1/42* (2013.01); *C21D 11/00* (2013.01); *C22C 19/00* (2013.01); *C22C 19/051* (2013.01); *C22C 19/055* (2013.01); *C22C 19/056* (2013.01); *C22F 1/10* (2013.01); *C22F 1/183* (2013.01); *H05B 6/06* (2013.01); *H05B 6/101* (2013.01); *C21D 2221/00* (2013.01); *Y02P 10/253* (2015.11)

(58) Field of Classification Search
CPC ...... B23K 2201/06; B23K 13/01; C21D 1/42; C21D 9/50; C22C 19/055; C22F 1/10
USPC ........................................ 219/635, 651, 607
See application file for complete search history.

(56) References Cited

U.S. PATENT DOCUMENTS

| | | | | |
|---|---|---|---|---|
| 778,016 | A * | 12/1904 | Doran P | ............... B29C 35/045 |
| | | | | 432/225 |
| 3,593,972 | A * | 7/1971 | Wehrle | ..................... C21D 1/42 |
| | | | | 266/102 |

(Continued)

FOREIGN PATENT DOCUMENTS

JP 59-001635 A 1/1984

OTHER PUBLICATIONS

International Search Report and Written Opinion dated Aug. 18, 2015, for corresponding PCT Application No. PCT/US2015/032601.

(Continued)

*Primary Examiner* — Dana Ross
*Assistant Examiner* — Lawrence Samuels
(74) *Attorney, Agent, or Firm* — Kinney & Lange, P.A.

(57) ABSTRACT

A method of performing a localized post weld heat treatment on a weld seam in a thin wall metallic body may include attaching thermocouples to the outside surface of the weld seam and covering the weld seam with a thermal insulating blanket. Cooling bands are attached to the outside of the body on both sides of the weld seam. An inert atmosphere enclosure with inlet and exhaust ports is fitted over the weld seam, thermal insulating blanket, and cooling bands. A power supply and control system for an induction coil or coils situated in close proximity to the weld seam are actuated and the weld seam is subjected to a heat treatment without thermally affecting regions of the metallic body adjacent to the weld seam and external to the cooling bands.

20 Claims, 7 Drawing Sheets

(51) Int. Cl.
*C22F 1/18* (2006.01)
*H05B 6/06* (2006.01)
*H05B 6/10* (2006.01)
*C21D 11/00* (2006.01)
*C22C 19/00* (2006.01)

(56) References Cited

U.S. PATENT DOCUMENTS

| | | | | |
|---|---|---|---|---|
| 3,790,413 | A | * | 2/1974 | Kanetake .................. C21D 1/42 148/210 |
| 4,160,543 | A | * | 7/1979 | Dill .......................... C21D 9/50 266/252 |
| 4,164,435 | A | * | 8/1979 | Kanetake ............. C21D 9/0087 148/503 |
| 4,644,272 | A | * | 2/1987 | Janos .................. G01N 27/9046 324/228 |
| 4,687,892 | A | * | 8/1987 | Brolin .................... B23K 20/24 219/611 |
| 4,732,026 | A | * | 3/1988 | Ban .................... B21D 51/2676 219/64 |
| 4,975,128 | A | * | 12/1990 | Schmitz .................. C21D 6/002 148/520 |
| 5,244,515 | A | * | 9/1993 | Miglin ...................... C22F 1/10 148/675 |
| 5,348,592 | A | * | 9/1994 | Garg ..................... B22F 3/1007 148/206 |
| 5,822,838 | A | * | 10/1998 | Seal ....................... B21D 51/24 156/172 |
| 7,032,809 | B1 | | 4/2006 | Hopkins |
| 8,511,504 | B2 | * | 8/2013 | Tuttle ..................... B64G 1/402 137/154 |
| 2001/0052511 | A1 | * | 12/2001 | Briand ................. B23K 9/0253 219/61 |
| 2003/0111473 | A1 | * | 6/2003 | Carter ....................... F17C 1/06 220/586 |
| 2005/0006828 | A1 | * | 1/2005 | Streubel .................. B60J 5/042 266/104 |
| 2005/0072500 | A1 | * | 4/2005 | Cao ...................... C22C 19/056 148/675 |
| 2007/0068933 | A1 | * | 3/2007 | Wilkes .................. B01J 8/0015 219/633 |
| 2008/0115863 | A1 | * | 5/2008 | McCrink ................... C21D 1/42 148/521 |
| 2008/0223735 | A1 | * | 9/2008 | Ishikawa ............. B29C 65/1435 206/0.6 |
| 2008/0308551 | A1 | * | 12/2008 | Wilcox ................. F27B 14/061 219/634 |
| 2009/0261574 | A1 | * | 10/2009 | Blueml ............... F01N 13/1838 285/21.1 |
| 2010/0140230 | A1 | | 6/2010 | Schreiber et al. |
| 2011/0052932 | A1 | * | 3/2011 | Pandey ................. B22F 3/1216 428/598 |
| 2012/0241355 | A1 | | 9/2012 | Tuttle et al. |
| 2013/0180693 | A1 | * | 7/2013 | Gomez ................ B23K 37/006 165/135 |

OTHER PUBLICATIONS

J. Gordine, "Some Problems in Welding Inconel 718", Welding Research Supplement, Nov. 1971, pp. 480-s to 484-s.

* cited by examiner

METHOD AND APPARATUS FOR PERFORMING A LOCALIZED POST-WELD HEAT TREATMENT ON A THIN WALL METALLIC CYLINDER

BACKGROUND

This invention relates to the post-weld heat treatment of thin wall metal structures. In particular the invention relates to a method of locally heat treating a weld seam without thermally affecting material adjacent to the weld.

The shells of typical satellite fuel and oxidizer tanks and liners of composite over-wrapped pressure vessels (COPV) for pressurant tanks are fabricated by welding metal domes or domes and cylinders together. Of many important design criteria, an overriding design driver is the need for low mass. The need for reduced mass drives the material choices and wall thickness of the tank design. In the areas of the welds that hold the domes and/or cylinders together, the thickness is often thicker than the rest of the tank because of the reduced available material strength caused by the effects of the welding process on the structure. Some of the local strength reductions are caused by increased grain size and other microstructural changes, loss of temper, and residual strain in the recast material. Some of these strength reductions can be alleviated through the use of post-weld heat treatments.

In a typical all metal satellite tank made of titanium, the tank may be subjected to a vacuum stress relief operation for approximately 2 hours at approximately 1000° F. (538° C.). The process requires significant expense in equipment, such as a vacuum furnace, special tooling, and handling and protection, wherein the tanks are wrapped with a number of layers of metal foil. In total, the process requires approximately 24 hours of time to accomplish. There are significant risks in returning the furnace chamber to atmospheric pressure because the tanks have small ports, are not rated for a negative pressure, and may collapse.

Alternatively the tanks may be stress relieved in an inert atmosphere or by using a retort. The disadvantages of a retort are largely in cost and time. Typical process times are greater than 40 hours and have proven to be significantly more costly than vacuum stress relief operations. Inert atmosphere heat treatments are generally used on larger tanks that do not fit in available vacuum furnaces.

In certain tanks, elastomeric bladders may be installed inside the tank shells. The bladders cannot survive the temperature of a post-weld heat treatment. As a result, the tank shell thickness and resulting mass must be increased to maintain strength margins caused by the reduced material properties at the weld locations.

SUMMARY

A method of performing a localized post-weld heat treatment on a weld seam in a thin wall metallic body includes attaching thermocouples to the external surface of the weld seam and covering the weld seam with a thermal insulating blanket. Cooling bands are attached to the external surface of the body on both sides of the weld seam. An inert atmosphere enclosure with inlet and outlet ports is fitted over the weld seam, thermal insulating blanket, and cooling bands. An inert atmosphere is provided inside the enclosure over the external surface of the weld seam as well as over the internal surface of the metallic body such that the internal and external surfaces of the weld seam are protected from oxidation. A power supply and control system for an induction coil or coils situated in close proximity to the weld seam are actuated and the weld seam is subjected to a heat treatment without thermally affecting regions of the metallic body external to the cooling bands.

In an embodiment, an apparatus for performing a localized post-weld heat treatment on a weld seam in a thin wall metallic body includes an induction coil or coils in close proximity to the weld seam and a corresponding power supply and control system for the induction coil. The apparatus further includes thermocouples attached to the weld seam, a thermal insulating blanket over the weld seam, and cooling bands on either side of the weld seam. An inert atmosphere enclosure with inlet and outlet ports is placed over the cooling bands, insulating blanket, and weld seam to provide an inert atmosphere on the external surface of the weld seam to protect the weld seam from oxidation during heat treatment. In a likewise manner, the apparatus provides an inert atmosphere over the internal surface of the body. An oxygen analyzer is attached to the outlet port to monitor the atmosphere during the heat treatment.

DETAILED DESCRIPTION

Thin wall welded structures may require post-weld heat treatments if as-welded, weld seams are weakened by the welding process due to, for instance, metallurgical, microstructural, and other changes, such as residual stress introduced by the fusion and solidification process during welding. Two solutions to this problem include heat treating the complete structure to strengthen and/or stress relieve each weld seam or increasing the section thickness in the vicinity of each weld seam to counter the loss of strength in the welds as a result of the welding process. In the first case, particularly with large structures, the equipment, atmosphere, and fixturing requirements and process times can be extensive. In the second case, particularly with space based structures, such as satellite fuel or oxidizer tanks, the increase in weight can be unacceptable in light of mission requirements.

Figure 1:
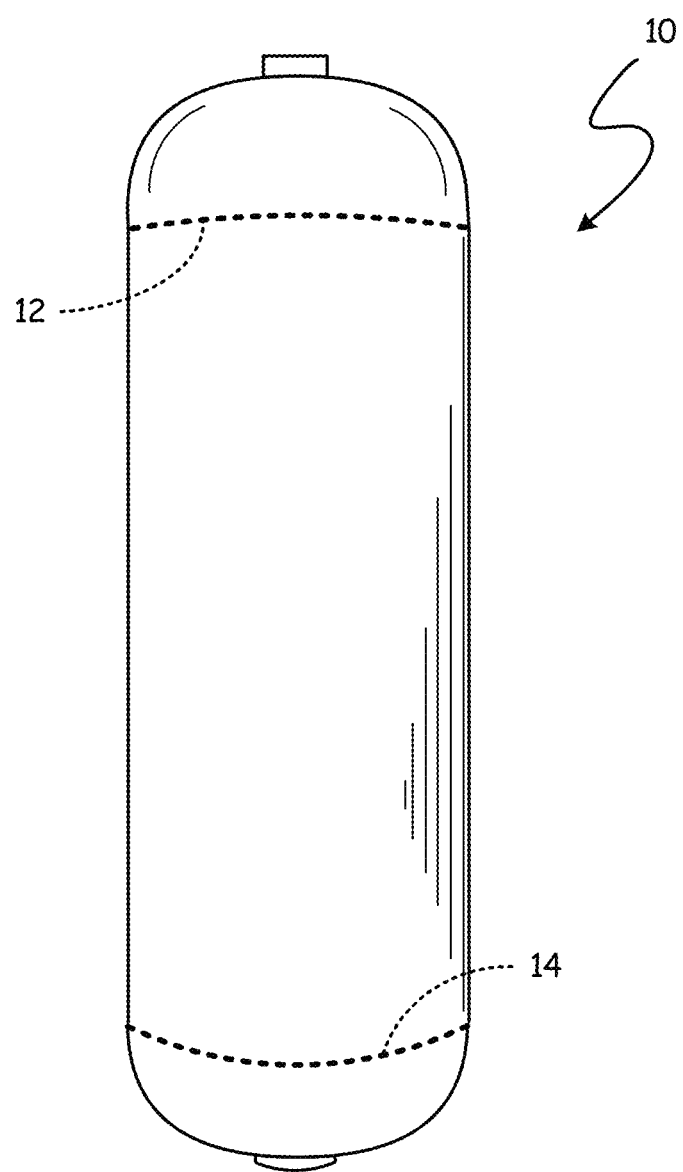
FIG. 1 is a representative satellite fuel or oxidizer tank.

Satellite fuel or oxidizer tank 10 is shown in FIG. 1. Satellite fuel or oxidizer tank 10 is a welded structure with the weld seams indicated by dashed lines 12 and 14.

Figure 2:
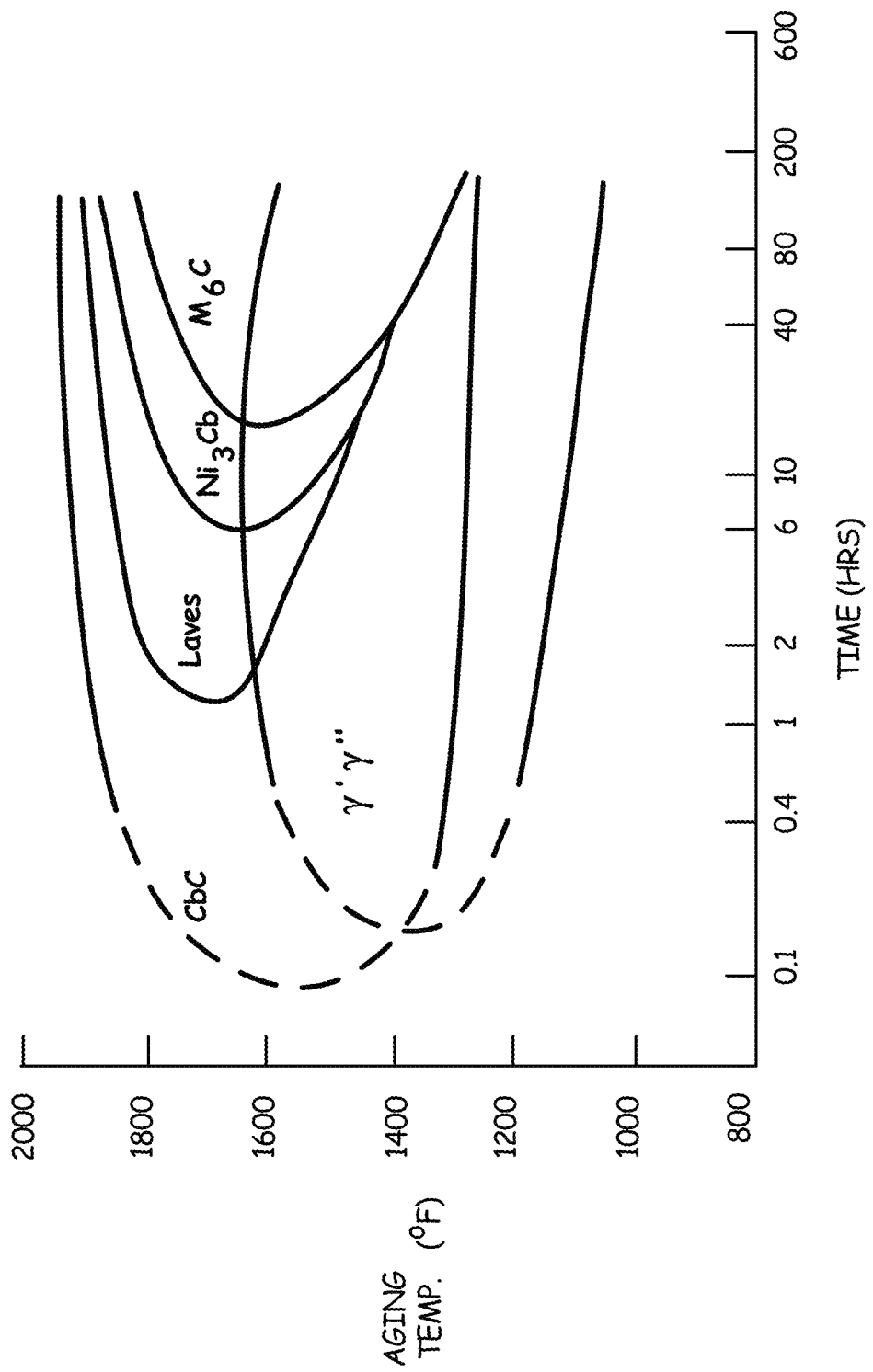
FIG. 2 is a time-temperature-transformation (TTT) diagram for Inconel 718 alloy.

Satellite fuel or oxidizer tanks are typically fabricated from titanium alloys, nickel-based superalloys corrosion resistant steels and aluminum alloys. In an embodiment of the present invention, a satellite tank may be fabricated from Inconel 718 alloy, a nickel-base superalloy. Weld seams in Inconel 718 alloy may require post-weld heat treatment as a result of microstructural and metallurgical changes that occur during the welding process. A time-temperature-transformation diagram for Inconel 718 alloy is shown in FIG. 2. The diagram indicates second phases that precipitate when their phase fields are intersected by the cooling curve traced following a high temperature solution anneal. The phases indicated on the diagram are gamma prime (γ') and gamma double prime (γ"), CbC, Laves phase, Ni$_3$Cb, and M$_6$C. Gamma prime and gamma double prime are coherent precipitates that form following a solution anneal, quench and age and are responsible for the high strength of most nickel-based superalloys. The other intermetallic phases precipitate throughout the microstructure during aging and may benefit or hinder the mechanical properties.

Two solution heat treat temperatures known in the art for Inconel 718 alloy are 1700° F. (927° C.) to 1850° F. (1010° C.) and 1900° F. (1038° C.) to 1950° F. (1066° C.). In the as-cast microstructure of an Inconel 718 weld, the lower temperature heat treatment may dissolve all of the gamma prime and gamma double prime phases but may not dissolve the others. This is partially beneficial since carbides and other grain boundary phases may resist grain growth during the solution anneal. On the other hand, Laves phases and carbides remaining in the microstructure may contribute to ductility loss.

Figure 3:
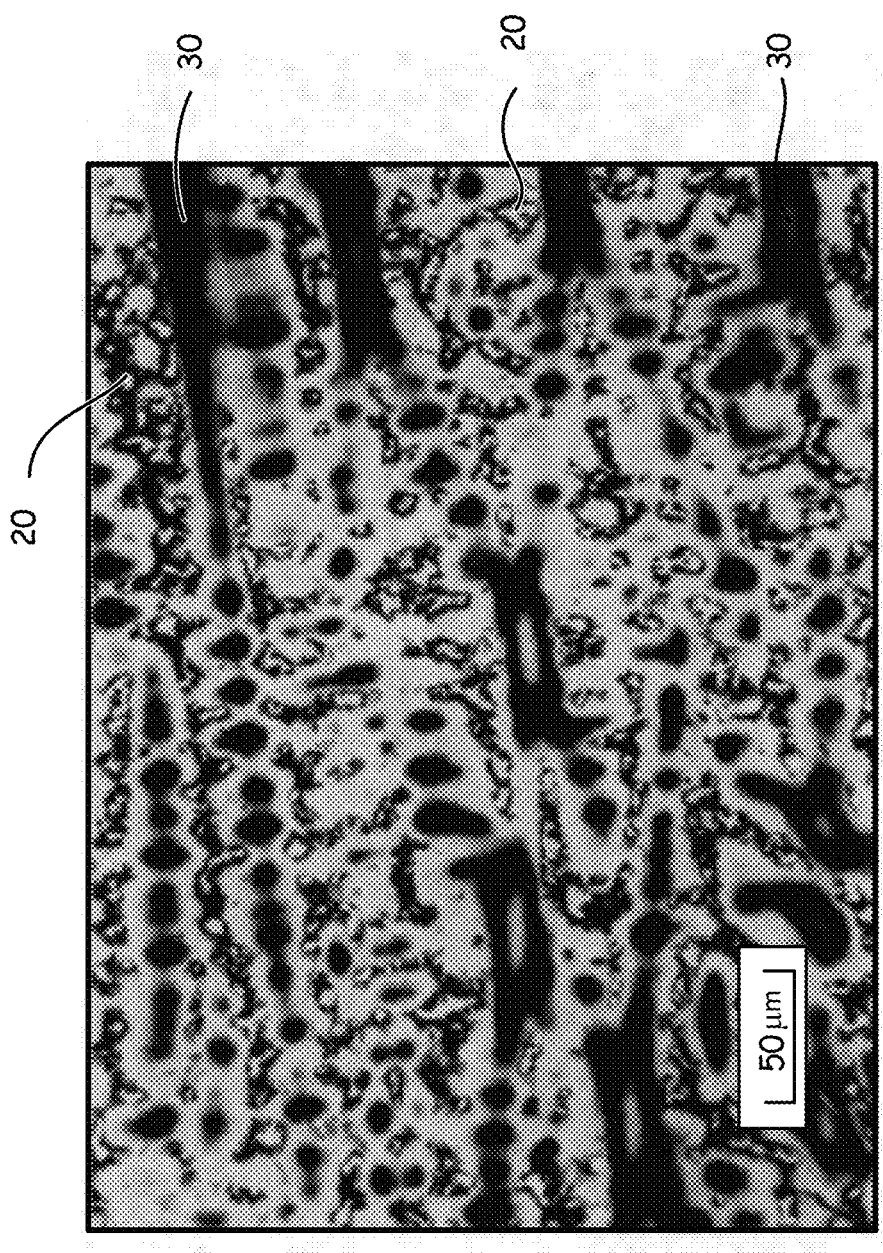
FIG. 3 is a photomicrograph of a gas-tungsten-arc weld in Inconel 718 using Inconel 718 filler metal solution heat treated at 1715° F. (955° C.) followed by an age hardening treatment.
Figure 4:
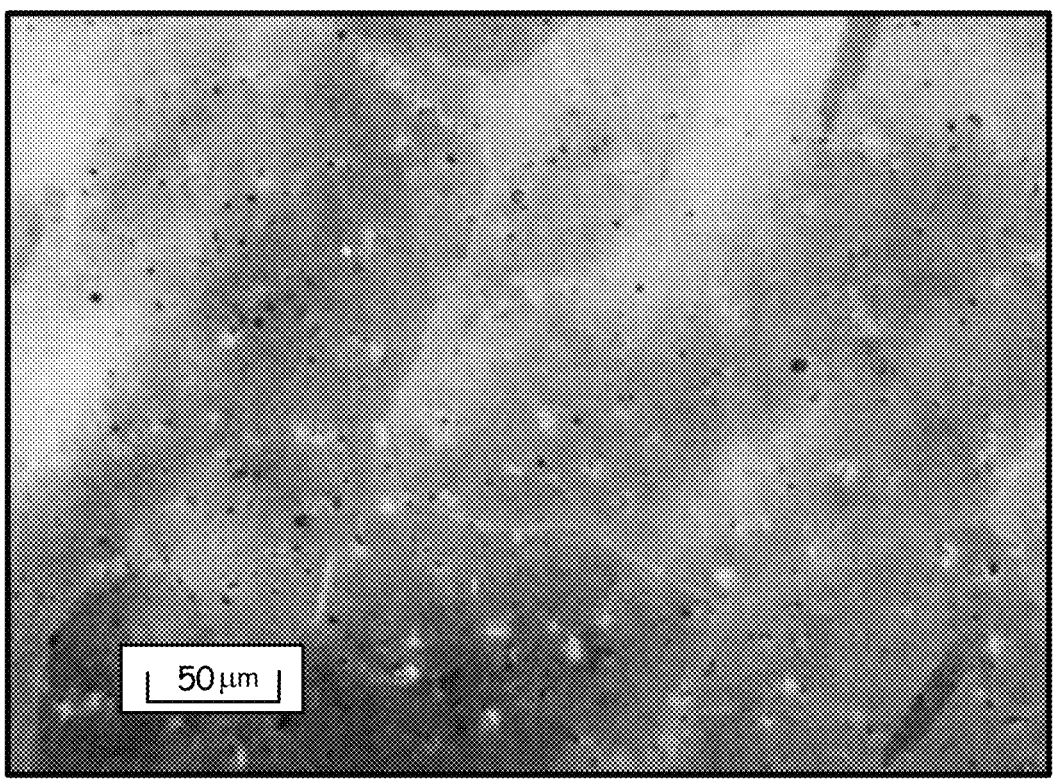
FIG. 4 is a photomicrograph of a gas-tungsten-arc weld in Inconel 718 using Inconel 718 filler metal solution heat treated at 1950° F. (1065° C.), furnace cooled to 1750° F. (955° C.) followed by an age hardening treatment.

Solution temperatures greater than 1900° F. (1038° C.) may result in the complete dissolution of all the phases in an Inconel 718 weld and may result in a cleaner microstructure. In this case, however, grain boundary phases that pin the grain boundaries are gone and extensive grain growth leading to lower strength may occur. The remedy to this situation may be a shorter high temperature solution anneal at 1950° F. (1,066° C.) followed by cooling to 1750° F. (954° C.) to finish the solution anneal followed by aging. In conventional furnaces, it may be difficult to minimize grain growth occurring at the higher temperature and during cooling to the lower temperature because the thermal mass of the furnaces prevents rapid cooling. An example of these effects are shown in FIG. 3 and FIG. 4. FIG. 3 is a 500× photomicrograph of the microstructure of a gas-tungsten-arc weld in an Inconel alloy 718 base metal using Inconel alloy 718 filler metal. The weld was subjected to a solution anneal at 1750° F. (955° C.) followed by an age hardening treatment. White appearing Laves phase particles 20 are situated in interdendritic areas formed during solidification. The Laves phase particles coexist with needle like delta phase (Ni$_3$Cb) particles 30 that precipitated during the heat treatment. Both phases can reduce ductility by acting as crack initiation sites. FIG. 4 shows a 500× photomicrograph of the microstructure of a gas-tungsten-arc weld in the Inconel 718 alloy of FIG. 3 using the same Inconel 718 alloy filler metal. The weld was subjected to a solution anneal at 1950° F. (1,065° C.), furnace cooled to 1750° F. (955° C.) followed by the same age hardening treatment. Most of the Laves and delta phases have been put in solution leaving a cleaner microstructure. It is suggested in the art that the carbide and Laves phase particles are sources of embrittlement by acting as fracture initiation sites. In FIGS. 3 and 4, the etchant was 5% chromic acid in water-electrolyte.

Figure 5:
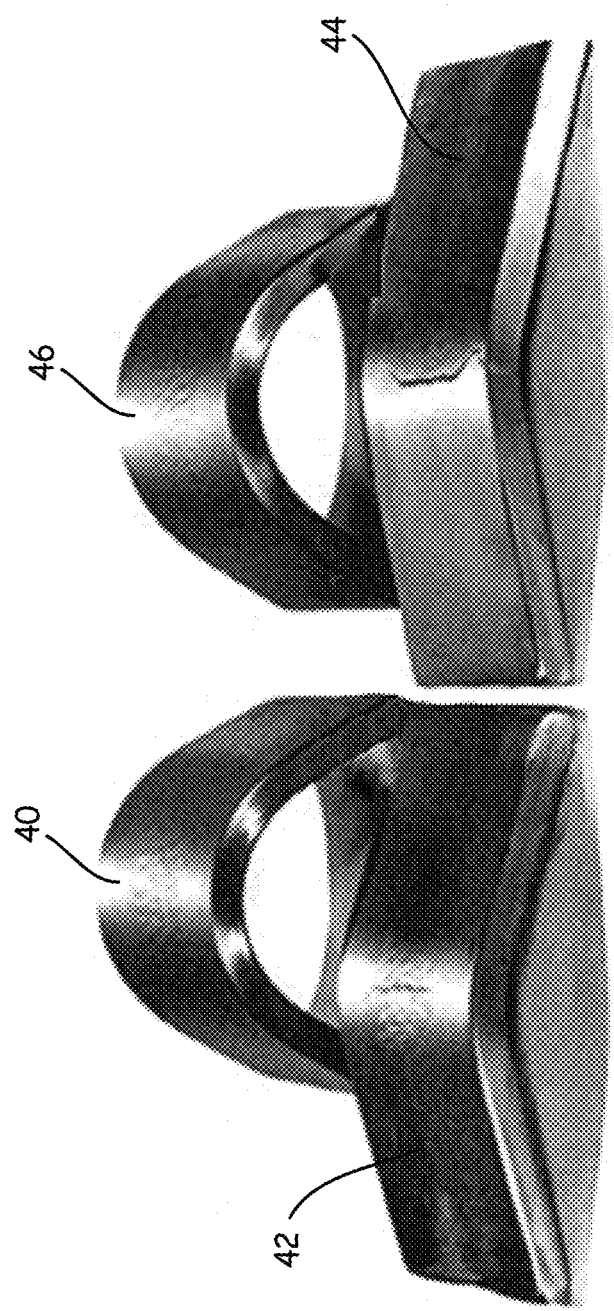
FIG. 5 is a photograph of 4½ inch thick (1.27 cm) Inconel 718 bend test samples with weld seams in the center of each sample with different post-weld heat treatments.

A pictorial confirmation of the benefits of the 1950° F. (1,065° C.) to 1750° F. (955° C.) followed by aging treatment schedule is shown in FIG. 5. FIG. 5 shows photographs of four ½ inch thick (1.27 cm) Inconel 718 alloy bend test samples with transverse gas-tungsten-arc welds through the midsection. Sample 40 was in the as-welded condition. Sample 42 was given a 1325° F. (720° C.) aging treatment. Sample 44 was given a 1750° F. (955° C.) solution anneal followed by a 1325° F. (720° C.) aging treatment. Sample 46 was given a 1950° F. (1065° C.) solution anneal followed by a furnace cool to 1750° F. (955° C.) followed by a 1325° F. (720° C.) aging treatment. The aging treatment alone and the 1750° F. (955° C.) solution treatment followed by aging both produced welds that were embrittled as indicated by visible surface fractures in bend test samples 42 and 44. As-welded sample 40 and heat treated sample 46 were not embrittled. Sample 46, after a high temperature solution treatment of 1950° F. (1065° C.) followed by cooling to 1750° F. (955° C.) before aging contained a weld with acceptable ductility and strength. The higher temperature solution treatment followed by aging is a preferred post-weld heat treatment for Inconel 718 alloy welds.

In an embodiment of the present invention, it may be possible to perform the post-weld heat treatment of sample 46 in FIG. 5 on thin wall Inconel 718 alloy structures including satellite fuel or oxidizer tanks to provide structures with acceptable mechanical integrity. In other embodiments, the present invention may be applied to post weld heat treatment of weld seams in thin wall metallic structures in general where local heat treatment of a weld seam may increase the mechanical integrity of the seam and eliminate the necessity of added section thickness in the weld leading to increased structural weight.

The present invention includes a method that may perform a localized post-weld heat treatment on a weld seam in a thin wall structure while leaving the structure in close proximity of the weld unaffected by the localized heat treatment. In the invention, heat treatment temperatures may be as high as 2000° F. (1093° C.) and atmospheres surrounding the weld seam may have oxygen levels of less than 50 ppm.

Figure 6:
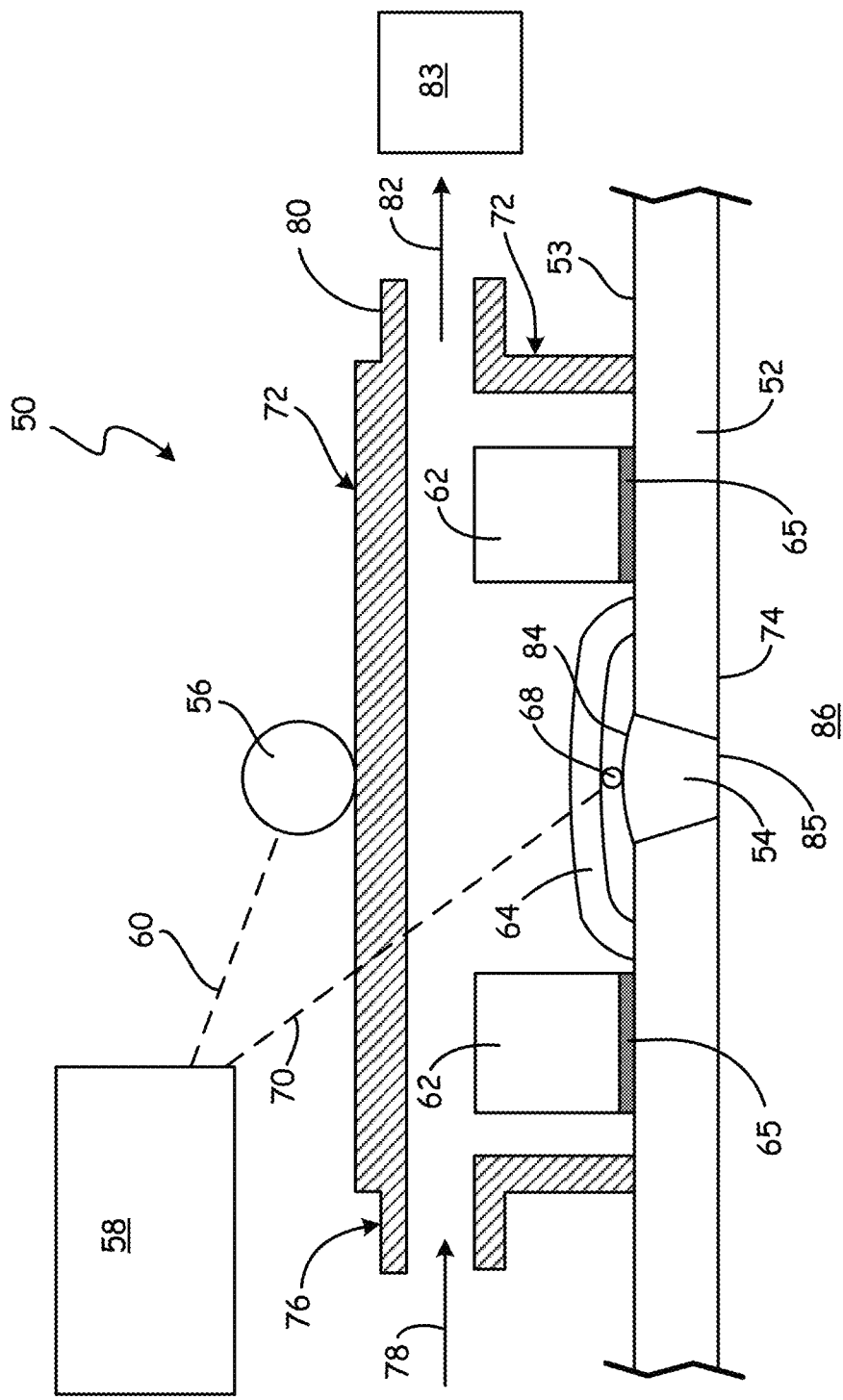
FIG. 6 is a schematic representation of the post weld heat treatment apparatus of the invention.

The invention also encompasses an apparatus that may include an enclosure covering a weld seam that contains an inert flowing gas, water cooled cooling bands mounted on each side of the weld seam, a thermal insulating blanket covering the weld seam, and an induction coil or coils in close proximity to the weld seam to locally heat the weld seam. A schematic cross section of inventive apparatus 50 is shown in FIG. 6. Apparatus 50 is shown positioned on external surface 53 of welded thin wall metallic body 52 surrounding weld seam 54. As noted earlier, in an embodiment, welded thin wall metallic body 52 may be a closed cylinder. In another embodiment, welded thin wall metallic body 52 may be a fuel or oxidizer tank. In other embodiments, apparatus 50 may be employed on any welded thin wall metallic structure. Although in FIG. 6, weld seam 54 illustrates a butt weld, other weld seams, such as lap, fillet, and others known in the art are included in the invention. The thickness of thin wall metallic body 52 may be from about 12 mils (305 microns) to about 250 mills (6350 microns) or more preferably from about 20 mils (508 microns) to about 125 mils (3175 microns).

Inventive apparatus 50 may further comprise induction coil 56 proximate weld seam 54. Induction coil 56 may be multiple induction coils as needed. Induction coil 56 may be energized by induction power supply and control system 58, as shown schematically by dotted line 60. Invention 50 may further comprise cooling bands 62, thermal insulating blanket 64, and thermocouple 68. Cooling bands 62 may be fluid cooled, thermoelectrically cooled, or cooled by other means known in the art. An exemplary cooling medium is water. Cooling bands 62 may be attached to thin wall metallic body 52 with thermally conductive adhesive 65 to ensure maximum thermal conductivity between cooling bands 62 and thin wall metallic body 52 to prevent regions of thin wall metallic body 52 external to cooling bands 62 from overheating.

Thermocouple 68 supplies temperature data to induction power supply and control system 58 as schematically indicated by dotted line 70. In an embodiment, thermocouple 68 may be replaced with an infrared pyrometer, thermistor or other temperature sensing devices known in the art. Weld seam 54, cooling bands 62, thermal insulating blanket 64, and thermocouple 68 may be covered with inert atmosphere enclosure 72. Inert atmosphere enclosure 72 may include inlet port 76 attached to a source of inert gas schematically indicated by arrow 78 and exhaust port 80 containing exhaust gas schematically indicated by arrow 82. Inert atmosphere enclosure 72 may be an electrically non-conducting material enclosure that is transparent to an inductive field. Suitable non-conducting materials for inert atmosphere enclosure 72 include flexible heat resistant materials such as silicone or rigid composites.

Inert gas 78 may be argon, nitrogen, helium, or others known in the art. Exhaust gas 82 may be passed through oxygen analyzer 83 to determine oxygen levels of the inert atmosphere leaving inert atmosphere enclosure 72. Oxygen levels of less than 50 ppm are preferred to prevent oxidation during the Post-Weld-Heat Treatment process.

External surface 84 of weld seam 54 and adjacent regions may be under an inert atmosphere during a post-weld heat treatment of the invention. In addition, internal surfaces 85 of weld seam 54 and internal surface 74 of thin wall metallic body 52 may also be protected by an inert atmosphere to match the inert atmosphere on external surface 84 of weld seam 54. If thin wall metallic body 52 of the invention comprises a fuel or oxidizer tank, interior 86 of the tank may be filled with inert gas to prevent oxidation during the welding process.

Figure 7:
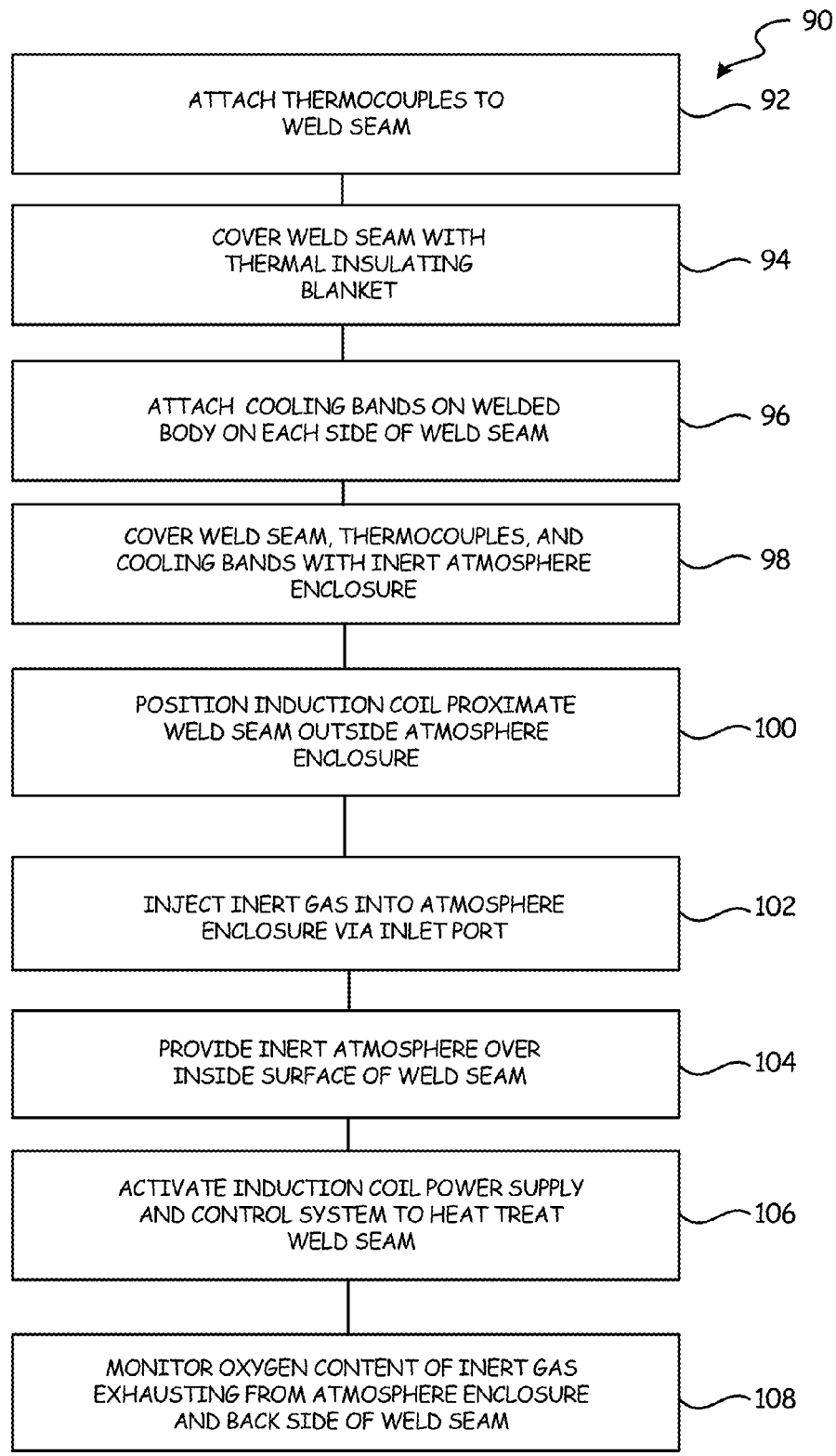
FIG. 7 is a diagram of the post weld heat treatment process of the invention.

Post-weld heat treatment method 90 of the present invention is shown in FIG. 7. In the first step, thermocouples 68 may be attached to weld seam 54 to indicate temperature during heat treatment (step 92). Weld seam 54 may then be covered with thermal insulating blanket 64 (step 94). Blanket 64 may be fabricated from any material with appropriate physical characteristics coupled with thermal and electrical insulating properties. Preferred insulating materials include woven fiberglass cloth or woven ceramic or refractory fiber cloth.

In the next step, cooling bands 62 may be attached to thin wall metallic body 52 on each side of weld seam 54 (step 96). Cooling bands 62 are shaped to closely follow the contour of external surface 53 of thin wall metallic body 52. In an embodiment, interfaces 65 between cooling bands 62 and thin wall metallic body 52 may be filled with a thermally conducting adhesive material to ensure maximum thermal conductivity between cooling bands 62 and external surface 53 of thin wall metallic welded body 52 as shown in FIG. 6. Examples of thermally conducting adhesive material forms include tapes, greases, pastes, and sheets.

In the next step, weld seam 54, thermocouples 68 and cooling bands 62 may be covered with inert atmosphere enclosure 72 (step 98). Inert atmosphere enclosure 72 may contain inlet port 76 connected to an inert gas source as indicated by arrow 78. Inert atmosphere enclosure 72 may also include exhaust port 80 wherein the exhaust gases, indicated by arrow 82, may be analyzed by oxygen analyzer 83. As noted earlier, inert atmosphere enclosure 72 may be an electrical non-conductor such that it is transparent to the induction field from induction coil 56.

Induction coil 56 (or multiple induction coils) may then be positioned proximate weld seam 54 outside inert atmosphere enclosure 72 (step 100). The induction system may include power supply and control system 58 connected to thermocouple 68 on weld seam 54 to provide a controllable time-temperature profile during the heat treatment.

In the next step, inert gas 78 may be inserted into inert atmosphere enclosure 72 (step 102). At this point, internal surface 85 of weld seam 54, and internal surface 74 of thin wall metallic body 52 may also be protected by inert atmosphere 78. A preferred oxygen level surrounding weld seam 54 is less than 50 ppm to prevent oxidation. As mentioned earlier, if the objective is to heat treat thin wall metal welds of tank structures, tank interior 86 may also be filled with flowing inert gas 78 (step 104).

Power supply and control system 58 may then be activated to perform a post-weld heat treatment of weld seam 54 (step 106). During the heat treatment, the oxygen content of inert gas 82 exiting inert atmosphere enclosure 72 and tank interior 86 may be monitored by oxygen analyzer 83 to ensure the absence of oxidation during the heat treatment process (Step 108.

The distinguishing benefit of apparatus 50 is that weldments in thin wall metallic structures can be given heat treatment profiles at temperatures exceeding 2000° F. (1098° C.) on site during which the heat affected zone is restricted to the immediate vicinity of the weld seam without affecting the microstructure and properties of the material directly adjacent to the weld seam. In addition, the low thermal mass of the method allows rapid cool down following solution treatment limiting unwanted precipitation and grain growth in the thin wall structure. Expensive and elaborate furnaces, retorts, and other equipment associated with heat treatment of complete structures are unnecessary.

The following are nonexclusive descriptions of possible embodiments of the present invention.

A method for performing a localized post-weld heat treatment on a thin wall metallic cylinder may include: providing a metallic body with a weld seam, the weld seam having an internal surface and an external surface; covering the external surface of the weld seam with an insulating blanket; attaching at least two cooling bands to the external surface of the body with at least one cooling band attached on each side of the weld seam; surrounding the weld seam, insulating blanket, and cooling bands with an inert atmosphere enclosure; providing an inert atmosphere within the inert atmosphere enclosure; providing an inert atmosphere over the internal surface of the body; positioning at least one induction coil proximate the weld seam and external to the inert atmosphere enclosures; activating the induction coil to subject the weld seam to a heat treatment schedule while cooling regions external to the weld seam with the cooling bands; and sensing temperature of the weld seam with a temperature sensor and controlling power supplied to the induction coil as a function of the sensed temperature.

The method of the preceding paragraph can optionally include, additionally and/or alternatively any, one or more of the following features, configurations and/or additional components:

The temperature sensor may comprise at least one thermocouple;

The metallic body may comprise a nickel base or cobalt base superalloy or mixtures thereof, a corrosion resistant steel, or a titanium alloy;

The nickel base superalloy may be Inconel 718;

The wall thickness of the metallic body may be from about 20 mils (508 microns) to about 125 mils (3175 microns);

The cooling bands may be water cooled copper structures;

The inert atmosphere enclosure may be an electrical nonconductor;

The atmosphere may be argon, nitrogen, or helium;

The thin wall metallic body may be a fuel or oxidizer tank;

The flow of inert gas through the enclosure may be controlled as a function of sensed oxygen content to maintain oxygen content at less than 50 ppm on the internal and external surfaces of the weld seam before, during, and after the heat treatment.

An apparatus for performing a localized post-weld heat treatment on a weld seam in a thin wall metallic body with an internal and external surface may include: a thermal insulating blanket covering the external surface of the weld seam; at least two cooling bands on the external surface of the body with at least one cooling band positioned on each side of the weld seam; an inert atmosphere enclosure, with an inlet port and an exhaust port, surrounding the cooling bands, the thermal blanket, and the weld seam; an inert gas source may be attached to the inlet port; an inert gas atmosphere may be provided over the internal surface of the body; an induction coil may be positioned outside the inert atmosphere enclosure proximate the weld seam; the temperature sensor may be positioned to sense temperature of the weld seam; and a power supply and control system may be electrically connected to the induction coil and the temperature sensor to supply power to the induction coil as a function of sensed temperature of the weld seam to provide localized post-weld heat treatment.

The apparatus of the preceding paragraph can optionally include, additionally and/or alternatively any, one or more of the following features, configuration and/or additional components:

The temperature sensor may comprise a thermocouple;

The cooling bands may be water cooled copper structures;

The inert gas source may comprise an oxygen, nitrogen, or helium source;

The inert atmosphere enclosure may be an electrically non-conducting structure;

An oxygen analyzer may be attached to the exhaust port of the inert atmosphere enclosure;

The thin wall metallic body may comprise a nickel base or cobalt base superalloy or mixtures thereof, a corrosion resistant steel, or a titanium base alloy;

The nickel base alloy may be Inconel 718;

The thickness of the thin wall metallic body may be from about 20 mils (508 microns) to about 125 mills (3175 microns);

The thin wall metallic body may be a fuel or oxidizer tank.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method comprising:
   providing a metallic body with a weld seam, the weld seam having an internal surface and an external surface;
   covering the external surface of the weld seam with an insulating blanket;
   attaching at least two cooling bands for cooling to the external surface of the body with at least one cooling band attached on each side of the weld seam;
   surrounding the weld seam, insulating blanket, and cooling bands with an inert atmosphere enclosure;
   providing an inert atmosphere within the inert atmosphere enclosure;
   providing an inert atmosphere over the internal surface of the body;
   positioning at least one induction coil proximate the weld seam and external to the inert atmosphere enclosure;
   activating the induction coil to subject the weld seam to a heat treatment schedule while cooling regions external to the weld seam with the cooling bands; and
   sensing temperature of the weld seam with a temperature sensor and controlling power supplied to the induction coil as a function of the sensed temperature.

2. The method of claim 1, wherein the temperature sensor comprises at least one thermocouple.

3. The method of claim 1, wherein the metallic body comprises a nickel-base, or cobalt-base superalloy or mixtures thereof, a corrosion resistant steel, or a titanium alloy.

4. The method of claim 3, wherein the nickel-base superalloy is Inconel 718.

5. The method of claim 1, wherein the wall thickness of the metallic body is from about 20 mils (508 microns) to about 125 mils (3175 microns).

6. The method of claim 1, wherein the cooling bands are water cooled copper structures.

7. The method of claim 1, wherein the inert atmosphere enclosure is an electrical nonconductor.

8. The method of claim 1, wherein the atmosphere is argon, nitrogen, or helium.

9. The method of claim 1, wherein the thin wall metallic body is a fuel or oxidizer tank.

10. The method of claim 1, and further comprising:
    controlling the flow of inert gas through the enclosure as a function of sensed oxygen content to maintain oxygen content at less than 50 ppm on the internal and external surfaces of the weld seam before, during, and after a heat treatment.

11. An apparatus for performing a localized post-weld heat treatment on a weld seam in a thin wall metallic body with an internal and external surface, the apparatus comprising:
    a thermal insulating blanket covering the external surface of the weld seam;
    at least two cooling bands for cooling on the external surface of the body with at least one cooling band positioned on each side of the weld seam;
    an inert atmosphere enclosure, with an inlet port and an exhaust port, surrounding the cooling bands, the thermal blanket, and the weld seam;
    an inert gas source attached to the inlet port;
    an inert gas atmosphere over the internal surface of the body;
    an induction coil positioned outside the inert atmosphere enclosure proximate the weld seam;
    a temperature sensor positioned to sense temperature of the weld seam; and a power supply and control system electrically connected to the induction coil and the temperature sensor to supply power to the induction coil as a function of sensed temperature of the weld seam to provide localized post-weld heat treatment.

12. The apparatus of claim 11, wherein the temperature sensor comprises a thermocouple.

13. The apparatus of claim 11, wherein the cooling bands are water cooled copper structures.

14. The apparatus of claim 11, wherein the inert gas source comprises an argon, nitrogen, or helium source.

15. The apparatus of claim 11, wherein the inert atmosphere enclosure is an electrically non-conducting structure.

16. The apparatus of claim 11, wherein, an oxygen analyzer is attached to the exhaust port of the inert atmosphere enclosure.

17. The apparatus of claim 11, wherein the thin wall metallic body comprises a nickel base or cobalt base superalloy or mixtures thereof, a corrosion resistant steel, or a titanium base alloy.

18. The apparatus of claim 17, wherein the nickel-base superalloy is Inconel 718.

19. The apparatus of claim 11, wherein the thickness of the thin wall metallic body is from about 20 mils (508 microns) to about 125 mils (3175 microns).

20. The apparatus of claim 11, wherein the thin wall metallic body is a fuel or oxidizer tank.

* * * * *